(12) United States Patent
Miyauchi et al.

(10) Patent No.: US 6,510,008 B1
(45) Date of Patent: Jan. 21, 2003

(54) ZOOM LENS

(75) Inventors: Yuji Miyauchi, Machida (JP); Tetsuhide Takeyama, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 40 days.

(21) Appl. No.: 09/870,985

(22) Filed: Jun. 1, 2001

(30) Foreign Application Priority Data

Jun. 6, 2000 (JP) ........................................ 2000-174230

(51) Int. Cl.[7] .............................................. G02B 15/14
(52) U.S. Cl. ........................ 359/687; 359/684; 359/686
(58) Field of Search ................................ 359/686, 687, 359/684

(56) References Cited

U.S. PATENT DOCUMENTS

| 5,189,558 A | 2/1993 | Ishii et al. ................... 359/687 |
| 6,124,983 A | * 9/2000 | Yahagi et al. ................ 359/683 |
| 6,185,048 B1 | 2/2001 | Ishii et al. ................... 359/687 |

FOREIGN PATENT DOCUMENTS

| JP | 08-082743 | 3/1996 |
| JP | 08-271787 | 10/1996 |
| JP | 08-320434 | 12/1996 |

* cited by examiner

*Primary Examiner*—Georgia Epps
*Assistant Examiner*—David N. Spector
(74) *Attorney, Agent, or Firm*—Pillsbury Winthrop LLP

(57) ABSTRACT

A zoom lens includes, in order from the object side, a first lens unit with positive refracting power, a second lens unit with negative refracting power, a third lens unit with positive refracting power, and a fourth lens unit with positive refracting power. At least, the second lens unit and the fourth lens unit are moved along the optical axis to change spaces between individual lens units, and thereby the magnification of the zoom lens is changed in the range of the wide-angle position to the telephoto position. In this case, the third lens unit has three positive lens elements and one negative lens element located at the most image-side position.

11 Claims, 15 Drawing Sheets

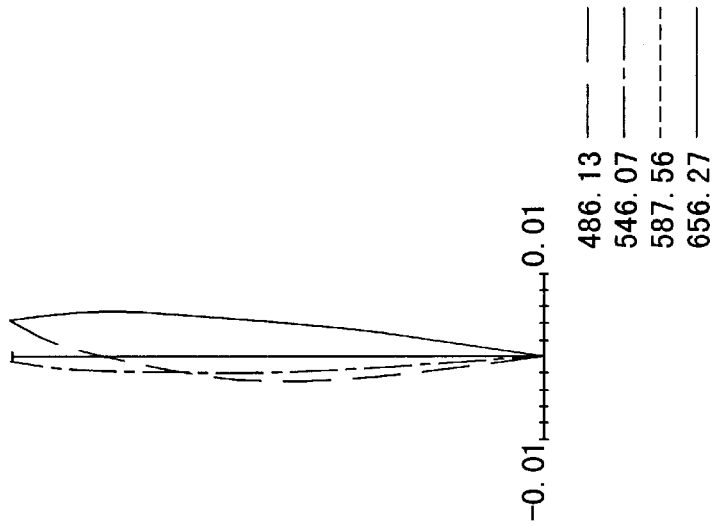
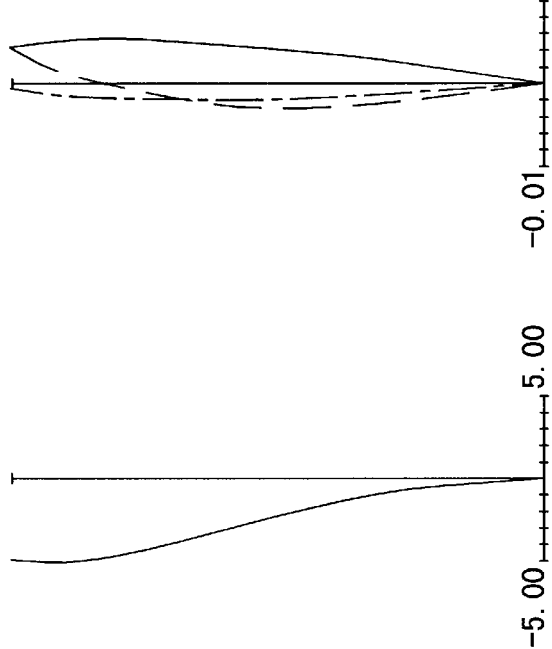
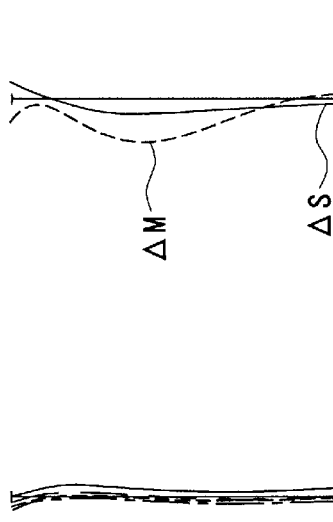

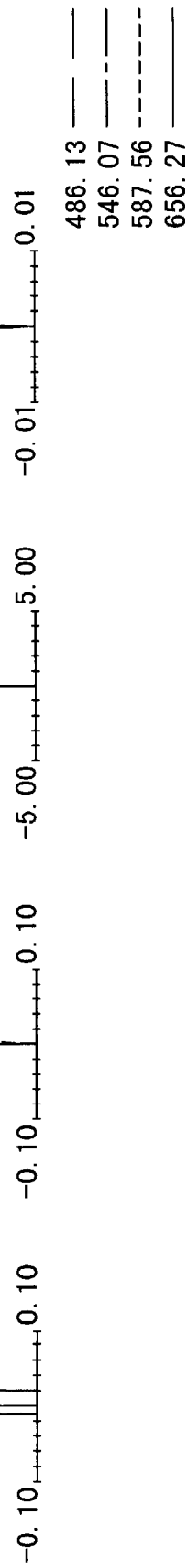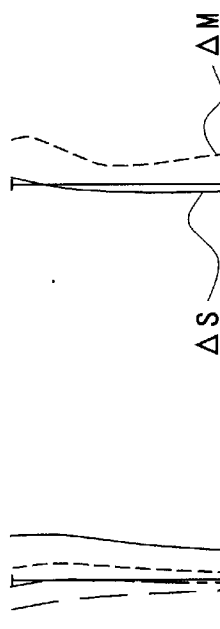

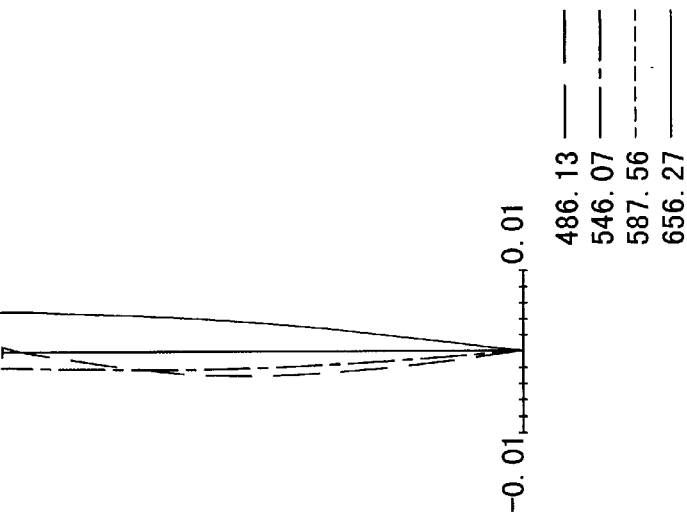
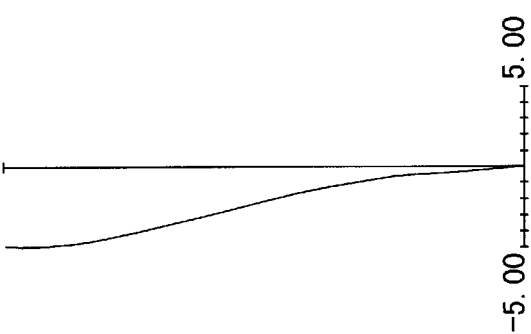
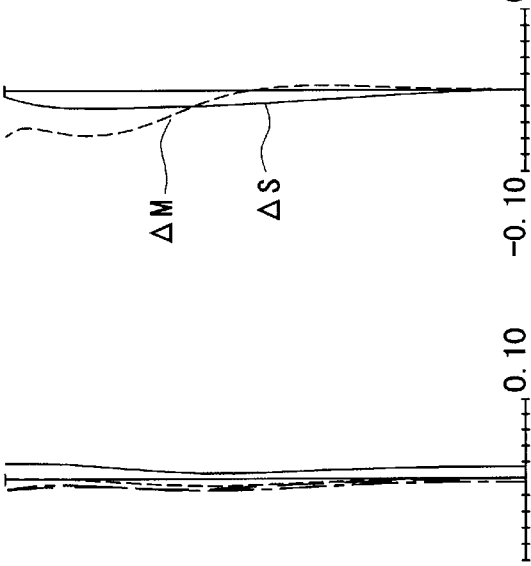
FIG.5A  FIG.5B  FIG.5C  FIG.5D

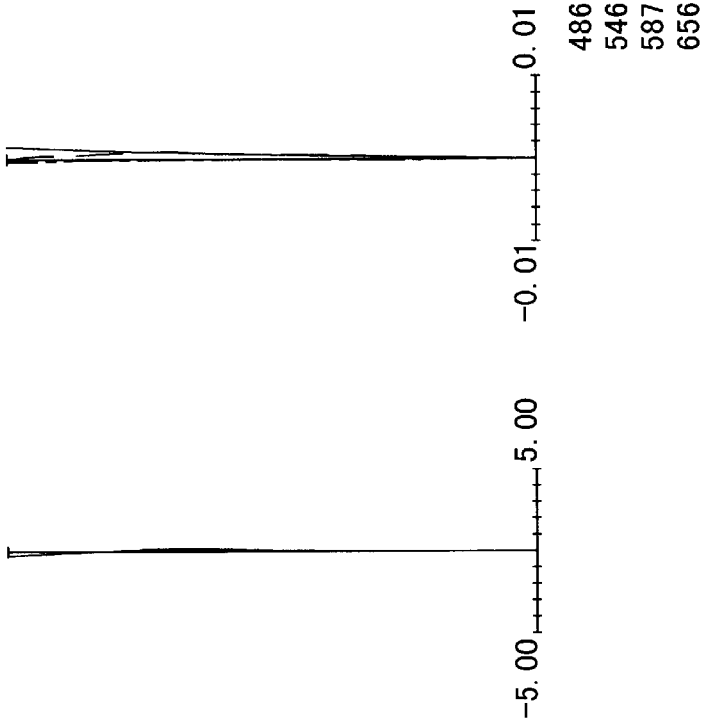
FIG.6A SPHERICAL ABERRATION FNO 2.601
FIG.6B ASTIGMATISM ω=12.07
FIG.6C DISTORTION ω=12.07
FIG.6D CHROMATIC ABERRATION OF MAGNIFICATION ω=12.07
486.13
546.07
587.56
656.27

FIG.8D
CHROMATIC ABERRATION OF MAGNIFICATION
ω=34.33
486.13
546.07
587.56
656.27
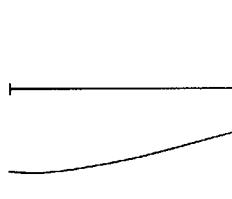
FIG.8C
DISTORTION
ω=34.33
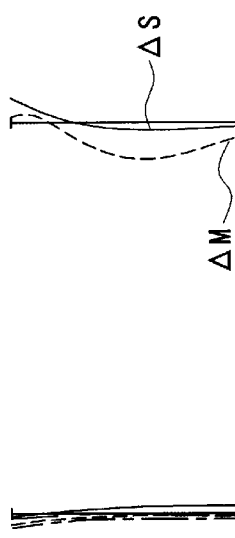
FIG.8B
ASTIGMATISM
ω=34.33
ΔS
ΔM
FIG.8A
SPHERICAL ABERRATION
FNO 2.037

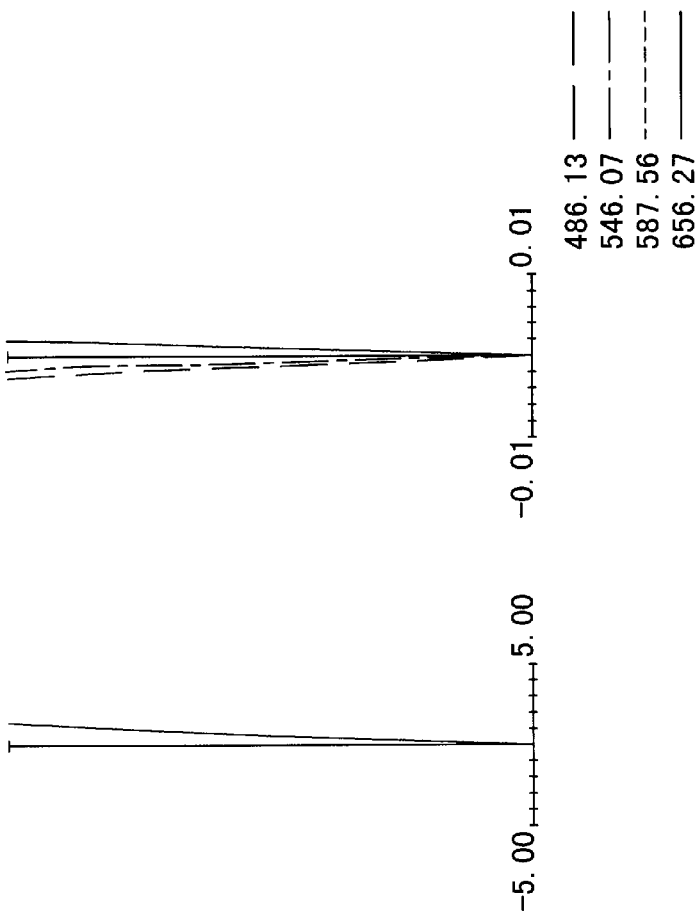

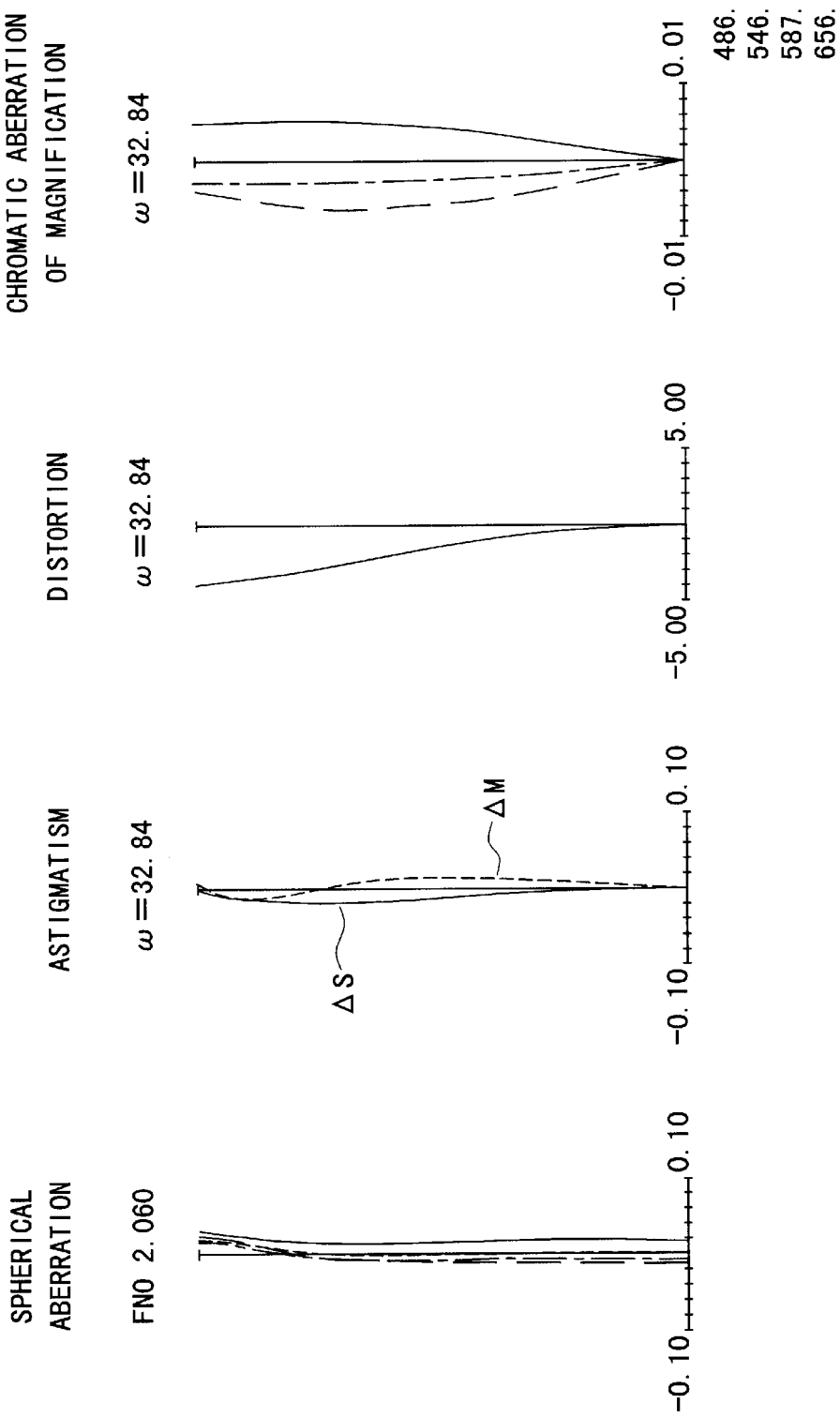

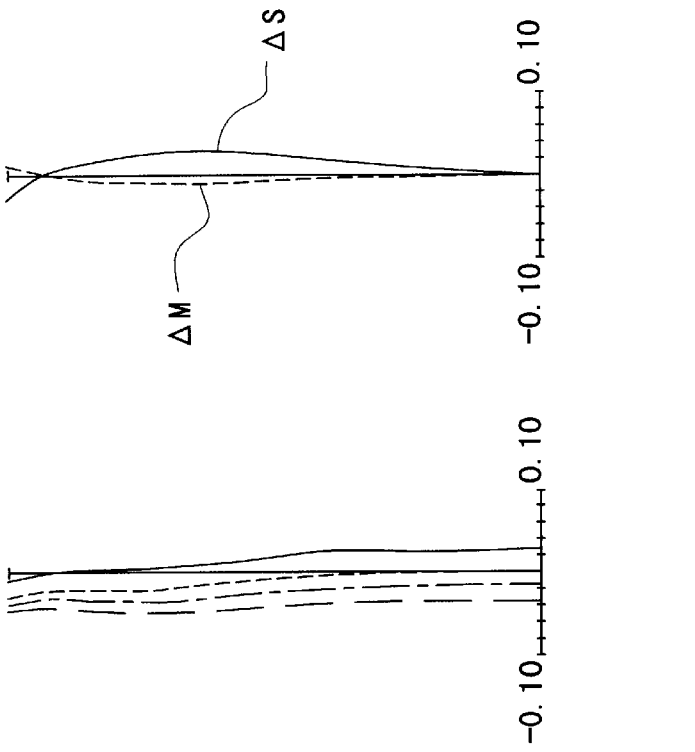
FIG.12A  SPHERICAL ABERRATION  FNO 2.157
FIG.12B  ASTIGMATISM  ω=12.16
FIG.12C  DISTORTION  ω=12.16
FIG.12D  CHROMATIC ABERRATION OF MAGNIFICATION  ω=12.16
486.13
546.07
587.56
656.27

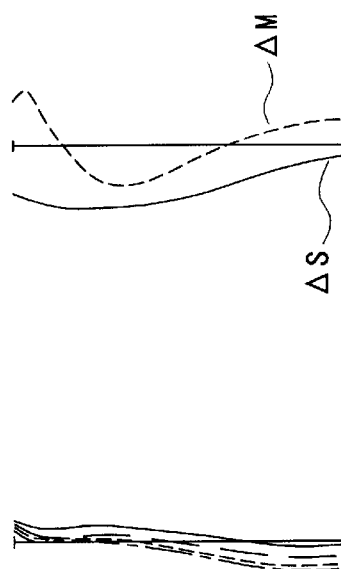

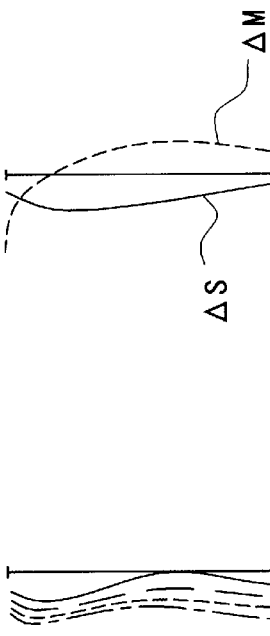
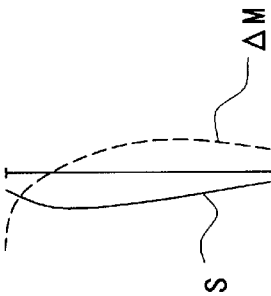
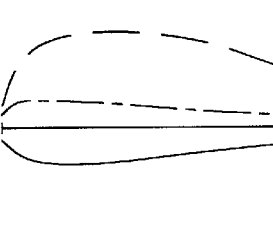

ZOOM LENS

BACKGROUND OF THE INVENTION

1. Field of the Invention

This invention relates to a zoom lens, and in particular, to a zoom lens which is small in size, high in image quality, and low in cost, used in a camera having an electronic imaging means, such as a camcorder or a digital camera.

2. Description of Related Art

A conventional zoom lens which has a variable magnification ratio of approximately 3 and offers a compact design and low cost for civilian use is set forth in Japanese Patent Preliminary Publication No. Hei 11-258507.

This zoom lens includes, in order from the object side, a first lens unit with positive refracting power, fixed when the magnification of the zoom lens is changed; a second lens unit with negative refracting power, moved from the object side toward the image side in the range of a wide-angle position to a telephoto position when the magnification is changed; a third lens unit with positive refracting power, moved from the image side toward the object side in the range of the wide-angle position to the telephoto position when the magnification is changed; and a fourth lens unit with positive refracting power, moved when the magnification is changed. In this case, a variable magnification function is shared between the second lens unit and the third lens unit, and thereby compactness of the zoom lens is achieved.

Zoom lenses set forth in Japanese Patent Preliminary Publication Nos. Hei 8-320434, Hei 8-271787, and Hei 4-43311 are known as zoom lenses with variable magnification ratios of 6–10 in which the third lens unit is fixed when the magnification is changed.

A zoom lens with a variable magnification ratio of about 20 is disclosed in Japanese Patent Preliminary Publication No. Hei 8-82743 in which the movement of the third lens unit of the zoom lens is complicated.

A high density of pixels of an electronic image sensor has recently been achieved, and a high image quality, not to speak of a compact design and low cost, is required for an imaging optical system. Increases in contrast and resolution fall within the category of this high density of pixels, and thus it is necessary to give special consideration to chromatic aberration and the entire photographing range. It is also necessary to ensure the amount of marginal light and to improve the F-number of a lens accordingly.

However, it is not said that the above conventional zoom lenses bring about image qualities corresponding to electronic image sensors in which the number of pixels is over two millions and a pixel pitch is below 3.8 $\mu$m. Alternatively, it is not said that a cost reduction is achieved, taking account of compactness and productivity.

SUMMARY OF THE INVENTION

It is, therefor an object of the present invention to provide a zoom lens which is capable of obtaining an image quality corresponding to an electronic image sensor having a great number of pixels or small pixels, compactness, and low cost at the same time.

In order to achieve this object, the zoom lens according to the present invention includes, in order from the object side, a first lens unit with positive refracting power, a second lens unit with negative refracting power, a third lens unit with positive refracting power, and a fourth lens unit with positive refracting power. At least, the second lens unit and the fourth liens unit are moved along the optical axis to change spaces between individual lens units, and thereby the magnification of the zoom lens is changed in the range of the wide angle position to the telephoto position. In this case, the third lens unit has three positive lens elements and one negative lens element located at the most image-side position.

In the zoom lens according to the present invention, it is desirable that the above first lens unit is constructed with a positive lens component.

The zoom lens according to the present invention includes, in order from the object side, a first lens unit with positive refracting power, a second lens unit with negative refracting power, a third lens unit with positive refracting power, and a fourth lens unit with positive refracting power. At least, the second lens unit and the fourth lens unit are moved along the optical axis to change spaces between individual lens units, and thereby the magnification of the zoom lens is changed in the range of the wide-angle position to the telephoto position. In this case, the fourth lens unit consists of, in order from the object side, a cemented lens component with positive refracting power and a single lens component with positive refracting power.

In the zoom lens according to the present invention, it is desirable that the above first lens unit is constructed with a positive lens component.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 2A, 2B 2C, and 2D are diagrams showing aberration curves at the wide-angle position of the zoom lens of the first embodiment;

FIGS. 3A, 3B, 3C, and 3D are diagrams showing aberration curves at the telephoto position of the zoom lens of the first embodiment;

FIGS. 5A, 5B, 5C, and 5D are diagrams showing aberration curves at the wide-angle position of the zoom lens of the second embodiment;

FIGS. 6A, 6B, 6C, and 6D are diagrams showing aberration curves at the telephoto position of the zoom lens of the second embodiment;

FIGS. 8A, 8B, 8C, and 8D are diagrams showing aberration curves at the wide-angle position of the zoom lens of the third embodiment;

FIGS. 9A, 9B, 9C, and 9D are diagrams showing aberration curves at the telephoto position of the zoom lens of the third embodiment;

FIGS. 11A, 11B, 11C, and 11D are diagrams showing aberration curves at the wide-angle position of the zoom lens of the fourth embodiment;

FIGS. 12A, 12B, 12C, and 12D are diagrams showing aberration curves at the telephoto position of the zoom lens of the fourth embodiment;

FIGS. 14A, 14B, 14C, and 14D are diagrams showing aberration curves at the wide-angle position of the zoom lens of the fifth embodiment; and FIGS. 15A, 15B, 15C, and 15D are diagrams showing aberration curves at the telephoto position of the zoom lens of the fifth embodiment;

DETAILED DESCRIPTION OF THE PREFERRED EMBODIMENTS

Figure 1A:
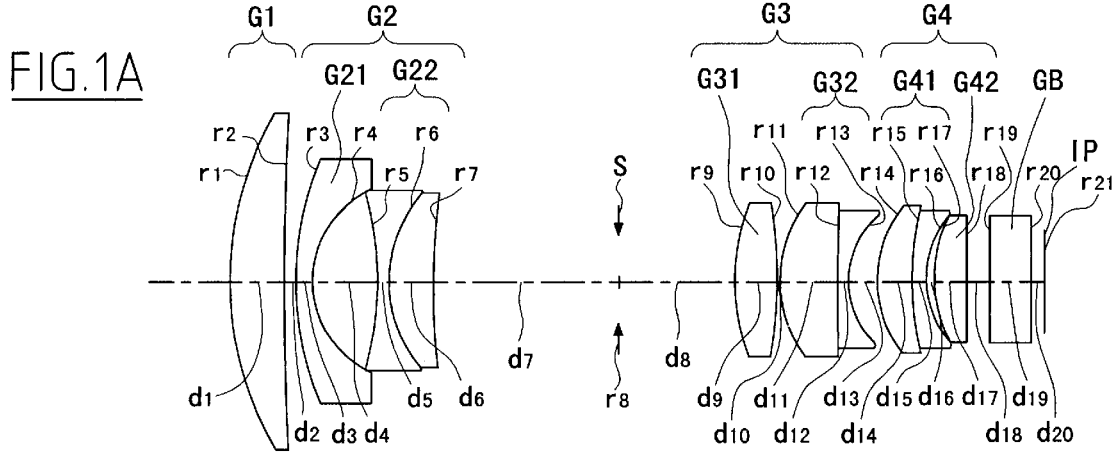
FIGS. 1A, 1B, and 1C are sectional views showing arrangements, developed along the optical axis, at wide-angle, middle, and telephoto positions, respectively, of the zoom lens of a first embodiment in the present invention.

Before undertaking the explanation of the embodiments, it will be expedient to describe the function and effect of the present invention.

In the zoom lens having, in order from the object side, the first lens unit with positive refracting power, the second lens unit with negative refracting power, the third lens unit with positive refracting power, and the fourth lens unit with positive refracting power, an axial beam become thick in the third lens unit. Hence, in order to obtain a bright zoom lens in which the F-number is reduced, it is effective that the third lens unit is favorably corrected for aberration.

As in the present invention, when the third lens unit is constructed with at least three positive lens elements and one negative lens element located at the most image-side position, the curvature of each lens surface of the third lens unit or the refracting power of each lens element can be reduced. Whereby, the production of aberration can be suppressed and at the same time, an adverse influence of a manufacturing error on imaging performance can be lessened.

In the present invention, when the first lens unit is constructed so that it is fixed when focusing is performed, the fluctuation of aberration caused by focusing can be prevented, which is favorable. In this case, it is good practice to perform focusing with the fourth lens unit, as described later.

In the first lens unit, when a positive lens component having a convex surface which is the object-side surface of a larger curvature than the image-side surface is placed, the angle of incidence of an off-axis beam can be rendered nearly perpendicular, and the production of high-order aberration can be minimized. Thus, aberration produced by the first lens unit is easily corrected through the second to fourth lens units.

In the present invention, when the first lens unit is constructed so that it is fixed when the magnification is changed, there is no need to drive the first lens unit which has the largest diameter of the lens units, and an imaging device can be simplified, downsized, and reduced in cost, which is favorable.

As mentioned above, when the third lens unit is designed to have at least three positive lens elements and one negative lens element located at the most image-side position, chromatic aberration and off-axis aberration produced by the first lens unit can be favorably corrected through the second to fourth lens units. Thus, even when the first lens unit is constructed with a positive lens component, namely a single lens component or a cemented lens component, a good image quality can be obtained.

In general, the first lens unit is large in diameter and thickness, heavy in weight, and costly. However, as in the present invention, when the first lens unit is constructed with a positive lens component which is a minimum requirement of optical constituents, compact and lightweight design and cost reduction of the zoom lens including a lens holding frame can be achieved.

Also, if the positive lens component in the present invention is constructed with a cemented lens component having a positive lens element and a negative lens element, this is disadvantageous for cost, but the lens component is not very large and chromatic aberration can be easily corrected. On the other hand, when the positive lens component is constructed with a single lens component, this becomes advantageous for cost.

As in the present invention, when the fourth lens unit is designed to have, in order from the object side, a cemented lens component with positive refracting power and a single lens component with positive refracting power, chromatic aberration and off-axis aberration produced by the first lens unit can be favorably corrected through the second to fourth lens units. Specifically, chromatic aberration is reduced through the cemented lens component and the positive refracting power is imparted to the entire cemented lens component. Whereby, the refracting power can be shared between the cemented lens component and the single positive lens component, and hence the production of aberration can be prevented. This brings about a special effect to suppress the fluctuation of aberration caused when the fourth lens unit is moved along the optical axis. In particular, when the F-number is reduced as the pixel pitch of the image sensor becomes small, and the amount of marginal light is ensured, coma flare of the marginal beam can be easily reduced.

On the other hand, when the fourth lens unit is constructed with only the single positive lends component, a light beam passing through its periphery undergoes considerable refracting action and the production of aberration becomes prominent.

In particular, when the fourth lens unit is designed to perform focusing, the fluctuation of aberration in focusing can be minimized, as described later.

In the present invention, when the first lens unit is constructed so that it is fixed in focusing, the fluctuation of aberration caused by focusing can be suppressed, which is favorable. In this case, it is good practice to perform focusing with the fourth lens unit, as described later.

In the first lens unit, when a positive lens component having a convex surface which is the object-side surface of a larger curvature than the image-side surface is placed, the angle of incidence of an off-axis beam can be rendered nearly perpendicular, and the production of high-order aberration can be minimized. Thus, aberration produced by the first lens unit is easily corrected through the second to fourth lens units.

When the first lens unit is constructed so that it is fixed when the magnification is changed there is no need to drive the first lens unit which has the largest diameter of the lens units, and an imaging device can be simplified, downsized, and reduced in costs, which is favorable.

As mentioned above, when the fourth lens unit is designed to have, in order fro the object side, the cemented lens component and the single positive lens component, chromatic aberration and off-axis aberration produced by the first lens unit can be favorably corrected through the second to fourth lens units. In general, the first lens unit is large in diameter and thickness, heavy in weight, and costly. However, as in the present invention, when the first lens unit is constructed with a positive lens component which is a minimum requirement of optical constituents, compact and lightweight design and cost reduction of the zoom lens including a lens holding frame can be achieved.

Also, if the positive lens component in the present invention is constructed with a cemented lens component hating a positive lens element and a negative lens element, this is disadvantageous for cost, but the lens component is not very large and chromatic aberration can be easily corrected. On the other hand, when the positive lens component is constructed with a single lens component, this becomes advantageous for cost.

In the present invention, it is desirable that the most image-side lens component of the third lens unit is constructed with a cemented lens component including at least one positive lens element and at least one negative lens element.

When the most image-side lens component of the third lens unit is constructed as described above, an adverse influence due to a manufacturing error can be further weakened. Moreover, by eliminating surfaces contacting with air between the positive and negative lens elements constituting the cemented lens component, the so-called ghost or flare produced from these surfaces can be suppressed.

That is, in view of the stability of the manufacturing error and the prevention of the degradation of image quality attributable to flare or ghost, in an optical system of the type that the third lens unit is constructed with three positive lens elements and one negative lens element placed at the most image-side position, when the most image-side lens component is constructed so that a positive lens element and a negative lens element are cemented to suppress flare, rather than constructed so that the function of correction for aberration is exercised by an air lens provided between the positive lens element and the negative lens element, the balance between low cost and high image quality can be held.

In the present invention, it is desirable that the cemented lens component is shaped into a meniscus form.

When the cemented lens component is constructed as mentioned above, the refracting power of the cemented lens component can be lowered, and thus the refracting power of the positive lens element placed on the object side of the cemented lens component in the third lens unit can be diminished. Consequently, the production of aberration can be prevented and at the same time, the adverse influence due to the manufacturing error can be weakened.

In the present invention, it is desirable that the cemented lens component with positive refracting power in the fourth lens unit is shaped into a meniscus form in which a convex surface is directed toward the object side.

The cemented lens component constructed in this way brings about an effect that a marginal beam is refracted in a direction different from the optical axis by the image-side concave surface of the cemented lens component, so that an exit pupil can be set, at a considerable distance away, by holding the overall length short.

It is also desirable that the cemented lens component with positive refracting power has, in order from the object side, a positive lens element and a negative lens element. By doing so, a well balanced arrangement that optical elements constituting the fourth lens unit which have positive, negative, and positive refracting powers is obtained, and the production of aberrations including chromatic aberration can be controlled.

In the present invention, it is favorable that the single lens component with positive refracting power in the fourth lens unit is such that the object-side surface has a larger curvature than the image-side surface.

When the single lens component of the fourth lens unit is constructed as mentioned above, the distance between the principal points of the single lens component with positive refracting power and the cemented lens component with positive refracting power can be reduced. Consequently, without increasing the refracting power of the single lens component, the refracting power of the fourth lens unit can be ensured.

In the present invention, it is favorable that when the magnification is changed in the range from the wide-angle position to the telephoto position, the third lens unit moved along the optical axis.

When the third lens unit is constructed in this way, a variable magnification function is shared between the second lens unit and the third lens unit, and thereby compactness of the zoom lens is achieved. In particular, the ability of the third lens unit to correct aberration is improved, and even when the variable magnification function is imparted to the third lens unit, a good image quality is obtained.

It is desirable that when the magnification is changed in the range from the wide-angle position to the telephoto position, the second lens unit is simply moved from the object side toward the image side, and the third lens unit is simply moved from the image side toward the object side.

It is favorable that when the magnification is changed, the movement of each lens unit is rather simple, in view of the structure of the frame and the distribution of the driving force of the lens unit. When the magnification is changed in the range from the wide-angle position to the telephoto position, an arrangement is made such that the second lens unit is simply moved from the object side toward the image side, while the third lens unit is simply moved from the image side toward the object side. By doing so, the amount of movement of each lens unit can be reduced, and this is favorable in view the structure of the frame and the distribution of the driving force of the lens unit.

In the present invention, it is desirable that when the magnification is changed the range from the wide-angle position to the telephoto position, the fourth lens unit moved so as to draw a convex trace toward the object side.

Consequently, the amount of movement of the fourth lens unit can be reduced, and the fluctuation of aberration produced by the fourth lens unit can be held to a minimum.

In the present invention, it is favorable that focusing on a nearby object point is performed by moving the fourth lens unit along the optical axis.

Since the angle of incidence of an axial beam on the fourth lens unit is relatively small, the fluctuation of aberration in focusing can be minimized when the fourth lens unit is constructed as mentioned above. Furthermore, the fourth lens unit is relatively small in lens diameter and light in weight, and thus has the advantage that the drive of the lens unit in focusing requires less torque. In particular, the fluctuation of aberration in focusing is minimized, and when an image sensor with a high density of pixels is used, it becomes easy to obtain a good image quality.

In the above description, when the third and fourth lens units are provided with aspherical surfaces, a better image quality can be obtained.

In accordance with the drawings and numerical data, the embodiments of the zoom lens of the present invention will be explained below. The zoom lens in each of the first to fourth embodiments to be described below includes, in order from the object side, a first lens unit with positive refracting power, a second lens unit with negative refracting power, a third lens unit with positive refracting power, and the fourth lens unit with positive refracting power so that when the magnification is changed in the range from the wide-angle position to the telephoto position, at least, the second lens unit and the fourth lens unit are moved along the optical axis to vary spaces between individual lens units.

First Embodiment

Figure 1B:
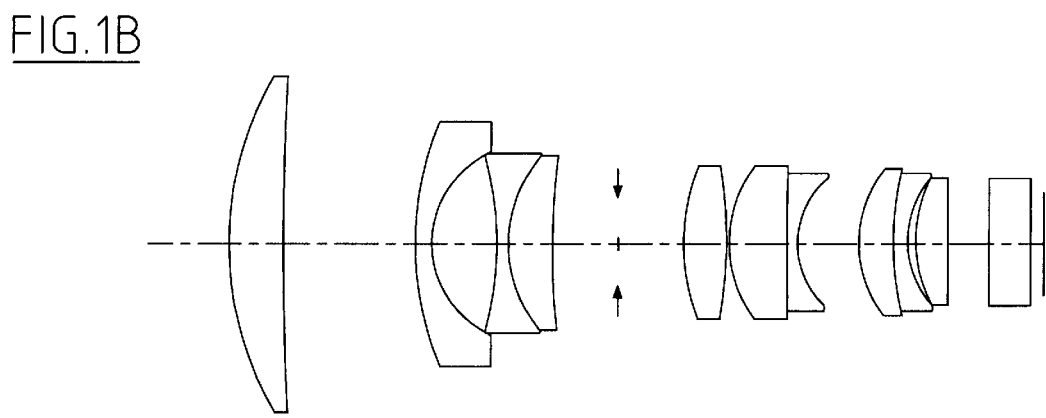
Figure 1C:
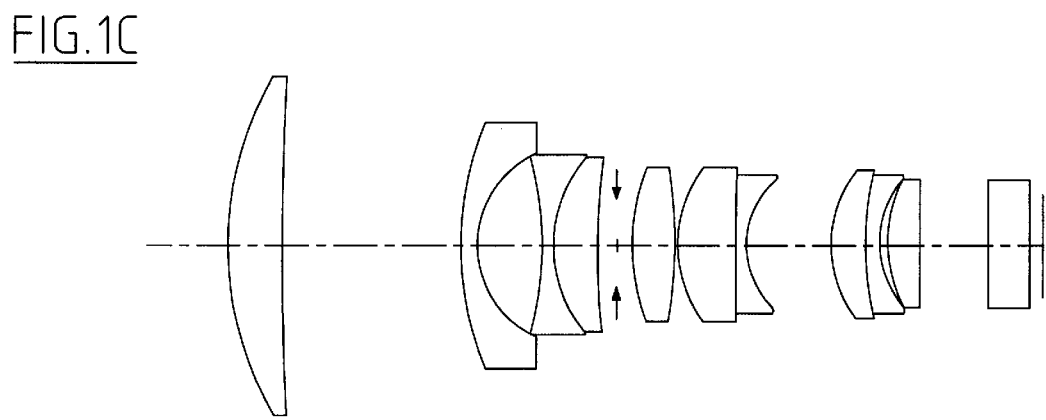

As shown in FIGS. 1A–1C, the zoom lens of this embodiment comprises, in order from the object side, a first lens unit G1 with positive refracting power, a second unit G2 with negative refracting power, a third lens unit G3 with positive refractor power, and a fourth lens unit G4 with positive refracting power. Also, in FIG. 1A, reference symbol S represents a stop, GB represents a glass block having the function of a low-pass filter or a near-infrared cutoff filter, and IP represents an imaging plane.

The first lens unit G1 is constructed with a positive lens component having a convex surface which is the object-side surface of a larger curvature than the image-side surface.

The second lens unit G2 includes, in order from the object side, a meniscus lens component G21 with negative refracting power and a cemented lens component G22 with negative refracting power. The cemented lens component G22 has, in order from the object side, a biconcave lens element and a meniscus lens element whose concave surface is directed toward the image side.

The third lens unit G3 includes, in order from the object side, a biconvex lens component G31 and a cemented lens component G32 with negative refracting power. The biconvex lens component G31 is configured so that its object-side surface is aspherical. The cemented lens component G32 has, in order from the object side, a positive lens element and a negative lens element, and is shaped into a meniscus form in which a convex surface is directed toward the object side.

The fourth lens unit G4 includes, in order from the object side, a cemented lens component G41 with positive refracting power and a biconvex lens component G42 with positive refracting power. The cemented lens component G41 has, in order from the object side, a positive lens element and a negative lens element, and is shaped into a meniscus form in which a convex surface is directed toward the object side. The biconvex lens component G42 is constructed with a single lens component having an aspherical convex surface which is the object-side surface of a larger curvature than the image-side surface.

The magnification is changed in the range from the wide-angle position to the telephoto position, with the first lens unit G1 fixed, in such a way that the second lens unit G2 is simply moved along the optical axis from the object side toward the image side, the third lens unit G3 is simply moved from the image side toward the object side, and the fourth lens unit G4 is moved so as to draw a convex trace from the image side toward the object side.

Focusing is performed by the fourth lens unit G4.

Subsequently, numerical data of optical members constituting the zoom lens of the first embodiment are shown below. In the numerical data of the first embodiment, ω denotes a half angle of view; f denotes the focal length of the zoom lens; FNO denotes the F-number of the zoom lens, $r_1$, $r_2$, ... denote radii of curvature of individual lens surfaces; $d_1$, $d_2$, ... denote thicknesses of individual lens components or elements or air spaces between them; $n_{d1}$, $nd_2$, ... denote refractive indices of individual lens components or elements at the d line; and $v_{d1}$, $v_{d2}$, ... denote Abbe's numbers of individual lens components or elements. Also, when z is taken as the coordinate in the direction of the optical axis, y is taken as the coordinate normal to the optical axis, K represents a conic constant, and $A_4$, $A_6$, $A_8$, $A_{10}$ and $A_{12}$ represent aspherical coefficients, the configuration of each of the aspherical surfaces is expressed by the following equation:

$$z = \frac{y^2/r}{1+\sqrt{1-(1+K)(y/r)^2}} + A_4 y^4 + A_6 y^6 + A_8 y^8 + A_{10} y^{10} + A_{12} y^{12}$$

These symbols are also used for the numerical data of other embodiments to be described later.

Numerical data 1

| | Wide-angle position | Middle position | Telephoto position |
|---|---|---|---|
| ω (°) | 32.44 | — | 11.76 |
| f (mm) | 7.300 | 14.000 | 21.000 |
| FNO | 1.85 | 2.24 | 2.69 |
| CCD pitch (μm) | | 4.2~3.2 | |

$r_1$ =   28.851
   $d_1$ = 4.51           $n_{d1}$ = 1.48749       $v_{d1}$ = 70.23
$r_2$ = 271.369
   $d_2$ = D2 (variable)
$r_3$ =   28.012
   $d_3$ = 1.40           $n_{d3}$ = 1.84666       $v_{d3}$ = 23.78
$r_4$ =    8.741
   $d_4$ = 5.47
$r_5$ =  −29.323
   $d_5$ = 1.00           $n_{d5}$ = 1.48749       $v_{d5}$ = 70.23
$r_6$ =   11.662
   $d_6$ = 3.67           $n_{d6}$ = 1.84666       vd6 = 23.78
$r_7$ =   64.495
   $d_7$ = D7 (variable)
$r_8$ = ∞ (stop)
   $d_8$ = D8 (variable)
$r_9$ =   17.600 (aspherical)
   $d_9$ = 3.52           $n_{d9}$ = 1.58913       $v_{d9}$ = 61.30
$r_{10}$ =  −42.139
   $d_{10}$ = 0.20
$r_{11}$ =   11.049
   $d_{11}$ = 4.90        $n_{d11}$ = 1.77250      $v_{d11}$ = 49.60
$r_{12}$ =  132.927
   $d_{12}$ = 0.90        $n_{d12}$ = 1.84666      $v_{d12}$ = 23.78
$r_{13}$ =    7.510
   $d_{13}$ = D13 (variable)
$r_{14}$ =   10.059
   $d_{14}$ = 2.90        $n_{d14}$ = 1.77250      $v_{d14}$ = 49.60
$r_{15}$ =   29.000
   $d_{15}$ = 1.22        $n_{d15}$ = 1.62004      $v_{d15}$ = 36.26
$r_{16}$ =    8.738
   $d_{16}$ = 0.64
$r_{17}$ =   10.354 (aspherical)
   $d_{17}$ = 2.71        $n_{d17}$ = 1.58913      $v_{d17}$ = 61.30
$r_{18}$ = −591.785
   $d_{18}$ = D18 (variable)
$r_{19}$ = ∞
   $d_{19}$ = 3.50        $n_{d19}$ = 1.51633      $v_{d19}$ = 64.14
$r_{20}$ = ∞
   $d_{20}$ = 1.00
$r_{21}$ = ∞ (imaging plane)

-continued

Numerical data 1

Aspherical coefficients

Ninth surface

K = 4.613
$A_4 = -1.43478 \times 10^{-4}$
$A_6 = -4.77173 \times 10^{-7}$
$A_8 = -8.64610 \times 10^{-8}$
$A_{10} = 2.69691 \times 10^{-9}$
$A_{12} = -4.11642 \times 10^{-11}$ Seventeenth surface K = −2.084
$A_4 = 4.47376 \times 10^{-5}$
$A_6 = -2.66743 \times 10^{-6}$
$A_8 = 2.51847 \times 10^{-7}$
$A_{10} = -1.35039 \times 10^{-8}$
$A_{12} = 2.23343 \times 10^{-10}$ Zoom data

|  | Wide-angle position | Middle position | Telephoto position |
|---|---|---|---|
| D2 | 1.00 | 10.98 | 15.22 |
| D7 | 15.72 | 5.74 | 1.50 |
| D8 | 9.83 | 5.53 | 1.50 |
| D13 | 2.46 | 5.27 | 7.38 |
| D18 | 1.91 | 3.40 | 5.31 |

FIGS. 2A–2D and 3A–3D show aberration curves in the zoom lens of the first embodiment.

Second embodiment

Figure 4A:
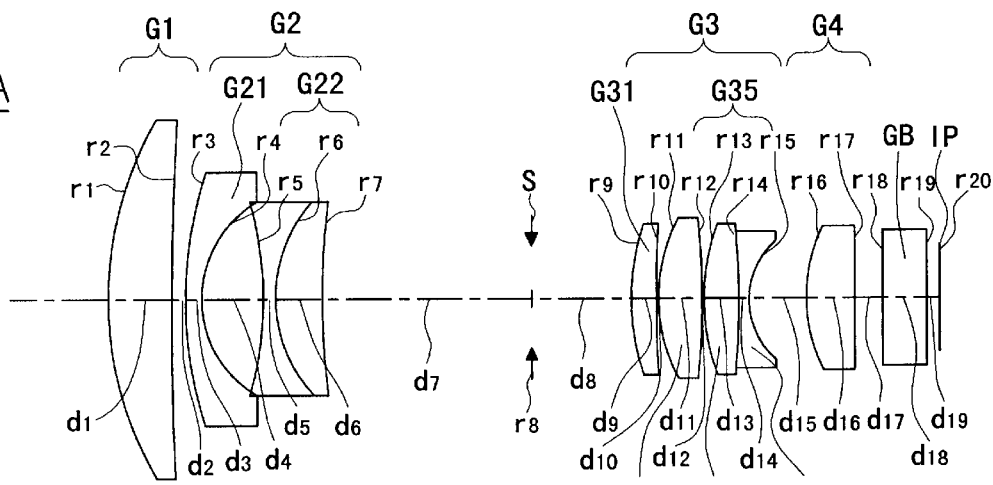
FIGS. 4A, 4B, and 4C are sectional views showing arrangements, developed along the optical axis, at wide-angle, middle, and telephoto positions, respectively, of the zoom lens of a second embodiment in the present invention.
Figure 4B:
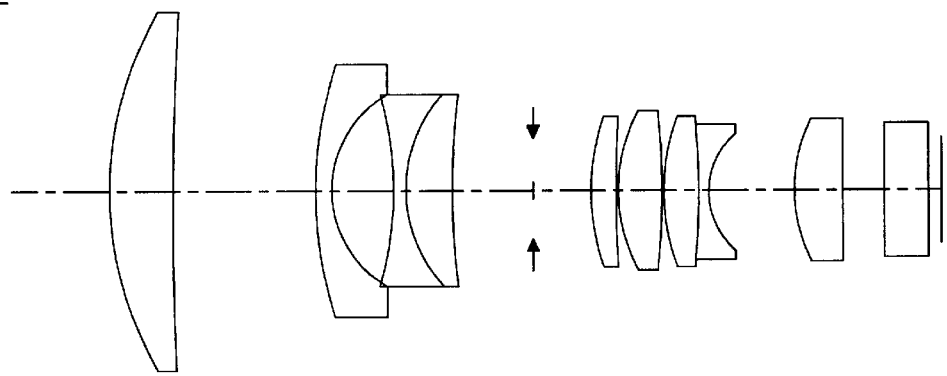
Figure 4C:
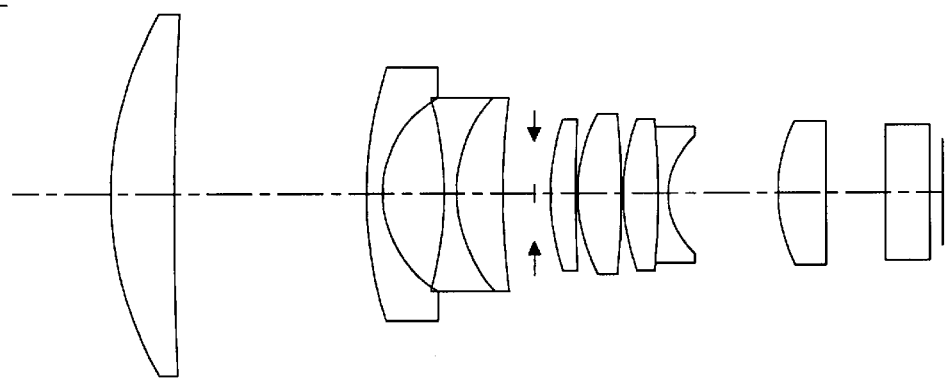

As shown in FIGS. 4A–4C, the zoom lens of this embodiment comprises, in order from the object side, the first lens unit G1 with positive refracting power, the second lens unit G2 with negative refracting power, the third lens unit G3 with positive refracting power, and the fourth lens unit G4 with positive refracting power.

The first lens unit G1 is constructed with a positive lens component having a convex surface which is the object-side surface of a larger curvature than the image-side surface.

The second lens unit G2 includes, in order from the object side, the meniscus lens component G21 with negative refracting power and the cemented lens component G22 with negative refracting power. The cemented lens component G22 has, in order from the object side, the biconcave lens element and the meniscus lens element whose concave surface is directed toward the image side.

The third lens unit G3 includes, in order from the object side, three positive lens elements G31, G32, and G33 and one negative lens element G34. The positive lens element G31 is configured so that its object-side surface is aspherical. Of these lens elements constituting the third lens unit G3, the negative lens element G34 is placed a the most image-side position. The positive lens element G33 and the negative lens element G34 are cemented to each other to constitute a cemented lens component G35, which is shaped into a meniscus form in which a concave surface is directed toward the image side.

The fourth lens unit G4 has a meniscus lens component with positive refracting power and is configured so that its objective-side surface is aspherical.

The magnification is changed in the range from the wide-angle position to the telephoto position, with the first lens unit G1 fixed, in such a way that the second lens unit G2 is simply moved along the optical axis from the object side toward the image side, the third lens unit G3 is simply moved from the image side toward the object side, and the fourth lens unit G4 is moved so as to draw a convex trace from the image side toward the object side.

Focusing is performed by the fourth lens unit G4.

Subsequently, numerical data of optical members constituting the zoom lens of the second embodiment are shown below.

Numerical data 2

| | Wide-angle position | Middle position | Telephoto position |
|---|---|---|---|
| ω (°) | 32.03 | — | 12.07 |
| f (mm) | 7.401 | 14.002 | 20.603 |
| FNO | 1.83 | 2.18 | 2.60 |
| CCD pitch (μm) | | 4.2~3.2 | |

$r_1 = 29.206$
$d_1 = 4.90$    $n_{d1} = 1.48749$    $v_{d1} = 70.23$
$r_2 = 310.915$
$d_2 = D2$ (variable)
$r_3 = 32.258$
$d_3 = 1.30$    $n_{d3} = 1.84666$    $v_{d3} = 23.78$
$r_4 = 8.746$
$d_4 = 4.83$
$r_5 = -29.551$
$d_5 = 1.00$    $n_{d5} = 1.48749$    $v_{d5} = 70.23$
$r_6 = 11.332$
$d_6 = 3.65$    $n_{d6} = 1.84666$    $v_{d6} = 23.78$
$r_7 = 70.822$
$d_7 = D7$ (variable)
$r_8 = \infty$ (stop)
$d_9 = D8$ (variable)
$r_9 = 18.048$ (aspherical)
$d_9 = 1.89$    $n_{d9} = 1.58913$    $vd9 = 61.30$
$r_{10} = 128.499$
$d_{10} = 0.20$
$r_{11} = 13.382$
$d_{11} = 3.25$    $n_{d11} = 1.77250$    $v_{d11} = 49.60$
$r_{12} = -68.503$
$d_{12} = 0.20$
$r_{13} = 16.004$
$d_{13} = 2.73$    $n_{d13} = 1.74100$    $v_{d13} = 52.64$
$r_{14} = -100.786$
$d_{14} = 0.97$    $n_{d14} = 1.84666$    $v_{d14} = 23.78$
$r_{15} = 6.456$
$d_{15} = D15$ (variable)
$r_{16} = 12.889$ (aspherical)
$d_{16} = 3.70$    $n_{d16} = 1.69350$    $v_{d16} = 53.22$
$r_{17} = 3330.862$
$d_{17} = D17$ (variable)
$r_{18} = \infty$
$d_{18} = 3.50$    $n_{d18} = 1.51633$    $v_{d18} = 64.14$
$r_{19} = \infty$
$d_{19} = 1.00$
$r_{20} = \infty$ (imaging plane)

Aspherical coefficients

Ninth surface

K = 1.005
$A_4 = -1.26209 \times 10^{-4}$
$A_6 = -4.85305 \times 10^{-8}$
$A_8 = -4.45932 \times 10^{-8}$
$A_{10} = 1.67745 \times 10^{-9}$
$A_{12} = -2.22788 \times 10^{-11}$ Sixteenth surface K = 0.334
$A_4 = -6.24473 \times 10^{-5}$
$A_6 = -8.90826 \times 10^{-7}$
$A_8 = 1.91196 \times 10^{-7}$
$A_{10} = -9.31464 \times 10^{-9}$
$A_{12} = 1.51614 \times 10^{-10}$ -continued Numerical data 2

Zoom data

| | Wide-angle position | Middle position | Telephoto position |
|---|---|---|---|
| D2 | 1.00 | 11.03 | 14.96 |
| D7 | 16.31 | 6.27 | 2.35 |
| D8 | 7.95 | 4.72 | 1.50 |
| D15 | 4.40 | 6.39 | 8.19 |
| D17 | 2.26 | 3.46 | 4.90 |

FIGS. 5A–5D and 6A–6D show aberration curves in the zoom lens of the second embodiment.

Third Embodiment

Figure 7A:
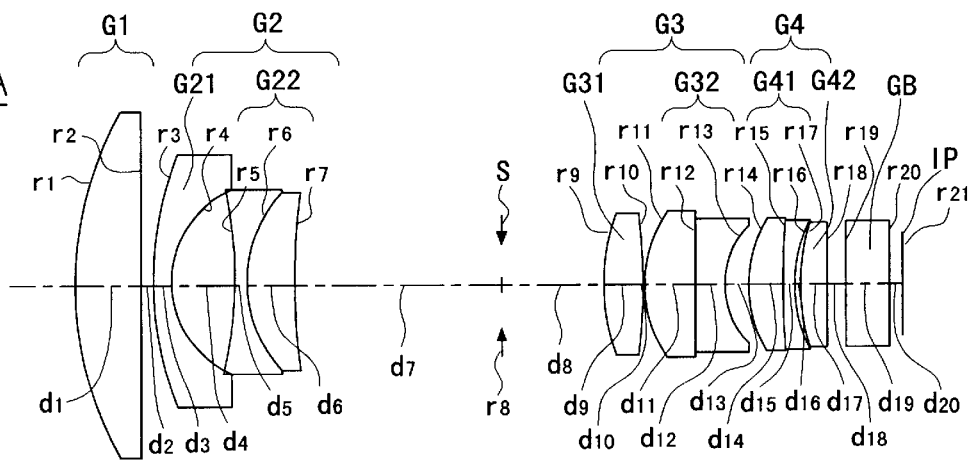
FIGS. 7A, 7B, and 7C are sectional views showing arrangements, developed along the optical axis, at wide-angle, middle, and telephoto positions, respectively, of the zoom lens of a third embodiment in the present invention.
Figure 7B:
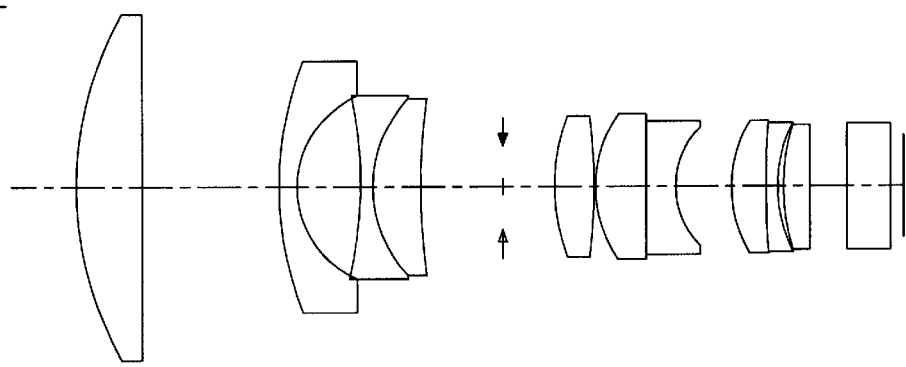
Figure 7C:
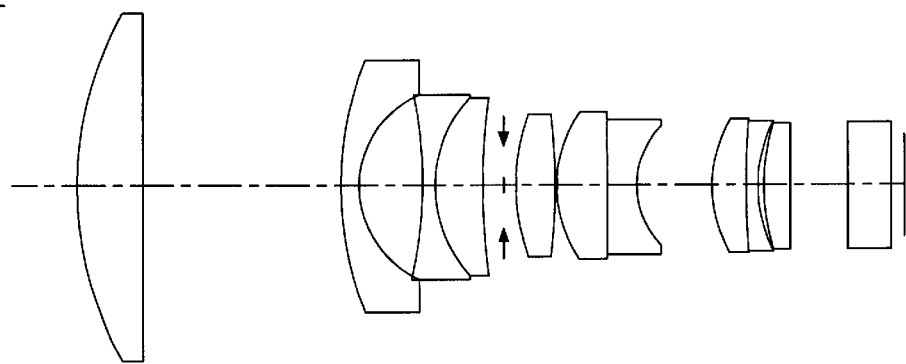

As shown in FIGS. 7A–7C, the zoom lens of this embodiment comprises, in order from the object side, the first lens unit G1 with positive refracting power, the second lens unit G2 with negative refracting power, the third lens unit G3 with positive refracting power, and the fourth lens unit G4 with positive refracting power.

The first lens unit G1 is constructed with the positive lens component having a convex surface which is the object-side surface of a larger curvature than the image-side surface.

The second lens unit G2 includes, in order from the object side, the meniscus lens component G21 with negative refracting power and the cemented lens component G22 with negative refracting power. The cemented lens component G22 has, in order from the object side, the biconcave lens element and the meniscus lens element whose concave surface is directed toward the image side.

The third lens unit G3 includes, in order from the object side, the biconvex lens component G31 and the cemented lens component G32 with negative refracting power. The biconvex lens component G31 is configured so that its object-side surface is aspherical. The cemented lens component G32 has, in order from the object side, the positive lens element and the negative lens element, and is shaped into a meniscus form in which a convex surface is directed toward the object side.

The fourth lens unit G4 includes, in order from the object side, the cemented lens component G41 with positive refracting power and the meniscus lens component G42 with positive refracting power. The cemented lens component G41 has, in order from the object side, the positive lens element and the negative lens element, and is shaped into a meniscus form in which a convex surface is directed toward the object side. The meniscus lens component G42 is constructed with a single lens component having a convex surface which is the object-side surface of a larger curvature than the image-side surface. The object-side surface of the meniscus lens component G42 is configured to be aspherical.

The magnification is changed in the range from the wide-angle position to the telephoto position, with the first lens unit G1 fixed, in such a way that the second lens unit G2 is simply moved along the optical axis from the object side toward the image side, and the third lens unit G3 and the fourth lens unit G4 are simply moved from the image side toward the object side.

Focusing is performed by the fourth lens unit G4.

Subsequently, numerical data of optical members constituting the zoom lens of the third embodiment are shown below.

Numerical data 3

| | Wide-angle position | Middle position | Telephoto position |
|---|---|---|---|
| ω (°) | 34.33 | — | 12.92 |
| f (mm) | 7.400 | 14.000 | 20.600 |
| FNO | 2.04 | 2.44 | 2.79 |
| CCD pitch (μm) | | 4.2~3.2 | |

$r_1$ = 29.293
  $d_1$ = 5.00    $n_{d1}$ = 1.48749    $v_{d1}$ = 70.23
$r_2$ = 259.135
  $d_2$ = D2 (variable)
$r_3$ = 30.889
  $d_3$ = 1.40    $n_{d3}$ = 1.84666    $v_{d3}$ = 23.78
$r_4$ = 8.818
  $d_4$ = 5.09
$r_5$ = −36.716
  $d_5$ = 1.00    $n_{d5}$ = 1.48749    $v_{d5}$ = 70.23
$r_6$ = 11.215
  $d_6$ = 3.94    $n_{d6}$ = 1.84666    $v_{d6}$ = 23.78
$r_7$ = 62.113
  $d_7$ = D7 (variable)
$r_8$ = ∞ (stop)
  $d_8$ = D8 (variable)
$r_9$ = 15.793 (aspherical)
  $d_9$ = 3.06    $n_{d9}$ = 1.58313    $v_{d9}$ = 59.44
$r_{10}$ = −42.777
  $d_{10}$ = 0.20
$r_{11}$ = 11.092
  $d_{11}$ = 4.13    $n_{d11}$ = 1.77250    $v_{d11}$ = 49.60
$r_{12}$ = −267.624
  $d_{12}$ = 2.20    $n_{d12}$ = 1.84666    $v_{d12}$ = 23.78
$r_{13}$ = 7.095
  $d_{13}$ = D13 (variable)
$r_{14}$ = 10.808
  $d_{14}$ = 2.89    $n_{d14}$ = 1.77250    $v_{14}$ = 49.60
$r_{15}$ = 80.244
  $d_{15}$ = 0.90    $n_{d15}$ = 1.60342    $v_{15}$ = 38.03
$r_{16}$ = 11.546
  $d_{16}$ = 0.50
$r_{17}$ = 14.479 (aspherical)
  $d_{17}$ = 2.09    $n_{d17}$ = 1.74330    $v_{d17}$ = 49.32
$r_{18}$ = 138.428
  $d_{18}$ = D18 (variable)
$r_{19}$ = ∞
  $d_{19}$ = 3.50    $n_{d19}$ = 1.51633    $v_{d19}$ = 64.14
$r_{20}$ = ∞
  $d_{20}$ = 1.00
$r_{21}$ = ∞ (imaging plane)

Aspherical coefficients

Ninth surface

K = 1.837
$A_4$ = −9.83431 × $10^{-5}$    $A_6$ = −1.02768 × $10^{-6}$    $A_8$ = −1.96295 × $10^{-8}$
$A_{10}$ = −2.72145 × $10^{-10}$    $A_{12}$ = −3.08581 × $10^{-12}$

Seventeenth surface

K = −4.834
$A_4$ = −9.21318 × $10^{-6}$    $A_6$ = 2.62554 × $10^{-6}$    $A_8$ = −5.38485 × $10^{-8}$
$A_{10}$ = −7.84820 × $10^{-9}$    $A_{12}$ = 2.50982 × $10^{-10}$

Zoom data

| | Wide-angle position | Middle position | Telephoto position |
|---|---|---|---|
| D2 | 1.00 | 11.28 | 16.26 |
| D7 | 16.76 | 6.48 | 1.50 |
| D8 | 7.79 | 4.16 | 1.50 |
| D13 | 2.09 | 4.51 | 5.79 |
| D18 | 1.88 | 3.09 | 4.46 |

FIGS. 8A–8D and 9A–9D show aberration curves in the zoom lens of the third embodiment.

Fourth embodiment

Figure 10A:
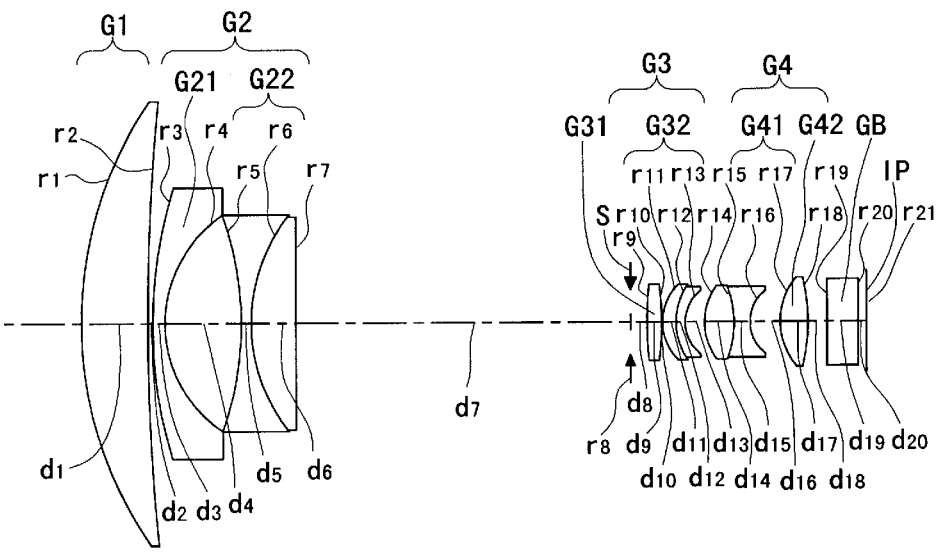
FIGS. 10A, 10B, and 10C are sectional views showing arrangements, developed along the optical axis, at wide-angle, middle, and telephoto positions, respectively, of the zoom lens of a fourth embodiment in the present invention.
Figure 10B:
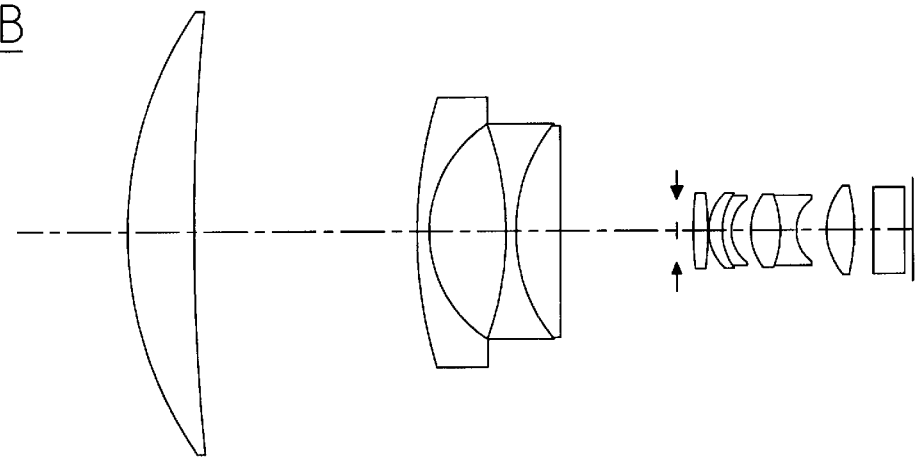
Figure 10C:
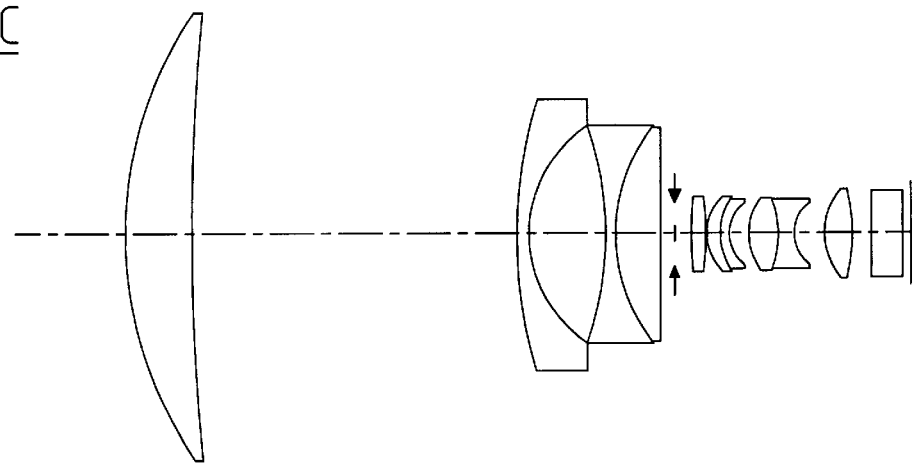

As shown in FIGS. 10A–10C, the zoom lens of this embodiment comprises, in order from the object side, the first lens unit G1 with positive refracting power, the second lens unit G2 with negative refracting power, the third lens unit G3 with positive refracting power, and the fourth lens unit G4 with positive refracting power.

The first lens unit G1 is constructed with the positive lens component having a convex surface which is the object-side surface of a larger curvature than the image-side surface.

The second lens unit G2 includes in order from the object side, the meniscus lens component G21 with negative refracting power and the cemented lens component G22 with negative refracting power. The cemented lens component G22 has, in order from the object side, the biconcave lens element and the meniscus lens element whose concave surface is directed toward the image side.

The third lens unit G3 includes, in order from the object side, the biconvex lens component G31 and the cemented lens component G32 with negative refracting power. The biconvex lens component G31 is configured so that its object-side surface is aspherical. The cemented lens component G32 has, in order from the object side, the positive lens element and the negative lens element, and is shaped into a meniscus form in which a convex surface is directed toward the object side.

The fourth lens unit G4 includes, in order from the object side, the cemented lens component G41 with positive refracting power and the biconvex lens component G42 with positive refracting power. The cemented lens component G41 has, in order from the object side, the positive lens element and the negative lens element, and is shaped into a meniscus form in which a convex surface is directed toward the object side. The biconvex lens component G42 is constructed with a single lens component having an aspherical convex surface which is the object-side surface of a larger curvature than the image-side surface.

The magnification is changed in the range from the wide-angle position to the telephoto position in such a way that the second lens unit G2 is simply moved along the optical axis from the object side toward the image side, and the first lens unit G1, the third lens unit G3, and the fourth lens unit G4 are simply moved from the image side toward the object side.

Focusing is performed by the fourth lens unit G4.

Subsequently, numerical data of optical members constituting the zoom lens of the fourth embodiment are shown below.

Numerical data 4

| | Wide-angle position | Middle position | Telephoto position |
|---|---|---|---|
| ω (°) | 32.84 | — | 12.16 |
| f (mm) | 7.107 | 13.725 | 19.981 |
| FNO | 2.06 | 2.12 | 2.16 |
| CCD pitch (μm) | | 4.2~3.2 | |

$r_1$ = 48.470
  $d_1$ = 7.48   $n_{d1}$ = 1.48749   $v_{d1}$ = 70.23
$r_2$ = 336.818
  $d_2$ = D2 (variable)
$r_3$ = 57.531
  $d_3$ = 1.20   $n_{d3}$ = 1.84666   $v_{d3}$ = 23.78

Numerical data 4 -continued $r_4$ = 16.239
  $d_4$ = 8.63
$r_5$ = −38.244
  $d_5$ = 1.18   $n_{d5}$ = 1.48749   $v_{d5}$ = 70.23
$r_6$ = 21.265
  $d_6$ = 4.53   $n_{d6}$ = 1.84666   $v_{d6}$ = 23.78
$r_7$ = 224.764
  $d_7$ = D7 (variable)
$r_8$ = ∞ (stop)
  $d_8$ = 1.94
$r_9$ = 44.973 (aspherical)
  $d_9$ = 1.54   $n_{d9}$ = 1.58913   $v_{d9}$ = 61.30
$r_{10}$ = −39.732
  $d_{10}$ = 0.10
$r_{11}$ = 6.394
  $d_{11}$ = 1.54   $n_{d11}$ = 1.77250   $v_{d11}$ = 49.60
$r_{12}$ = 8.307
  $d_{12}$ = 1.11   $n_{d12}$ = 1.84666   $v_{12}$ = 23.78
$r_{13}$ = 5.010
  $d_{13}$ = D13 (variable)
$r_{14}$ = 7.445
  $d_{14}$ = 3.26   $n_{d14}$ = 1.77250   $v_{14}$ = 49.60
$r_{15}$ = −14.514
  $d_{15}$ = 1.78   $n_{d15}$ = 1.62004   $v_{d15}$ = 36.26
$r_{16}$ = 5.146
  $d_{16}$ = 3.34
$r_{17}$ = 8.689 (aspherical)
  $d_{17}$ = 2.98   $n_{d17}$ = 1.48749   $v_{d17}$ = 70.23
$r_{18}$ = −30.459
  $d_{18}$ = D18 (variable)
$r_{19}$ = ∞
  $d_{19}$ = 3.50   $n_{d19}$ = 1.51633   $v_{d19}$ = 64.14
$r_{20}$ = ∞
  $d_{20}$ = 1.00
$r_{21}$ = ∞ (imaging plane)

Aspherical coefficients

Ninth surface $K = 0$
$A_4 = -6.61131 \times 10^{-5}$   $A_6 = 9.06473 \times 10^{-7}$   $A_8 = -1.17562 \times 10^{-7}$
$A_{10} = 2.92652 \times 10^{-9}$ Seventeenth surface $K = 0$
$A_4 = -1.51625 \times 10^{-4}$   $A_6 = 6.69952 \times 10^{-6}$   $A_8 = -8.83129 \times 10^{-8}$ Zoom data

| | Wide-angle position | Middle position | Telephoto position |
|---|---|---|---|
| D2 | 0.77 | 24.92 | 36.37 |
| D7 | 38.42 | 13.67 | 1.93 |
| D13 | 1.87 | 2.21 | 2.13 |
| D18 | 0.70 | 1.58 | 2.14 |

FIGS. 11A–11D and 12A–12D show aberration curves in the zoom lens of the fourth embodiment.

Fifth Embodiment

Figure 13A:
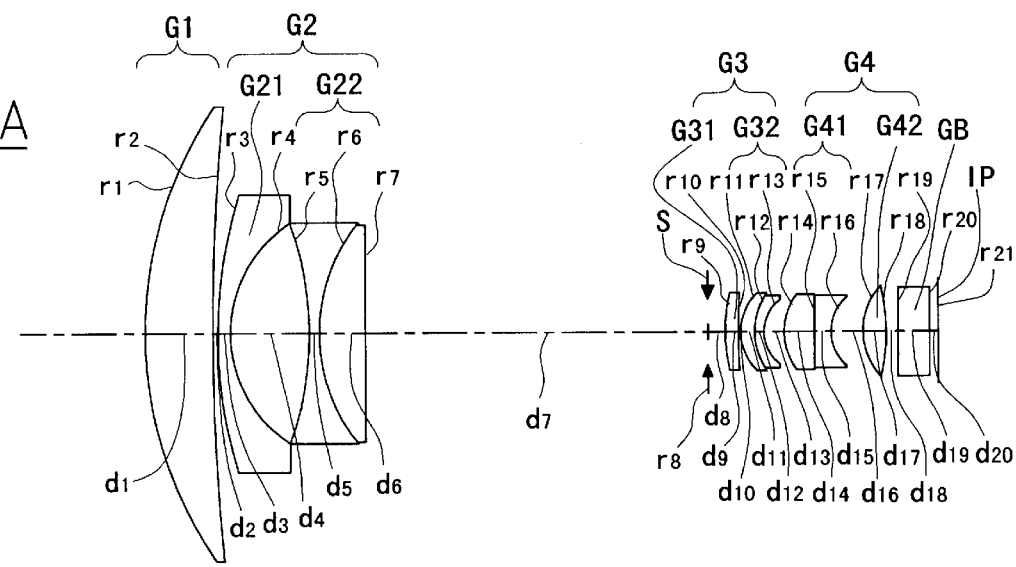
FIGS. 13A, 13B, and 13C are sectional views showing arrangements, developed along the optical axis, at wide-angle, middle, and telephoto positions, respectively, of the zoom lens of a fifth embodiment in the present invention.
Figure 13B:
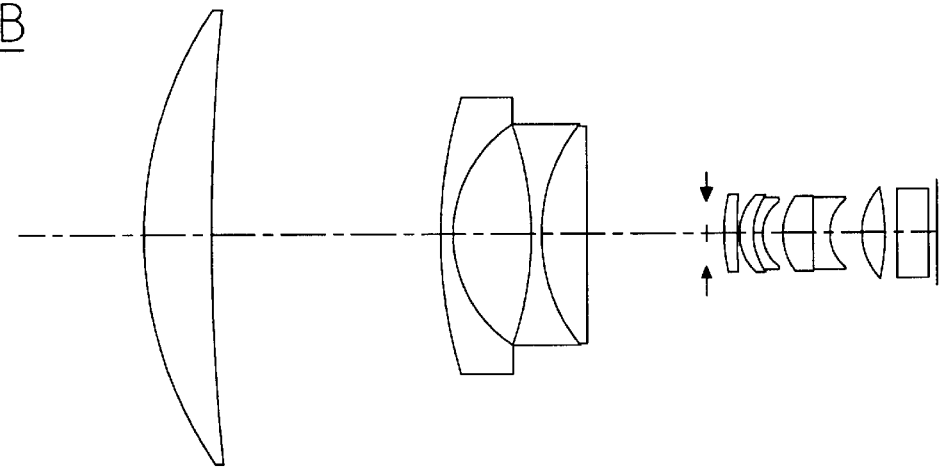
Figure 13C:
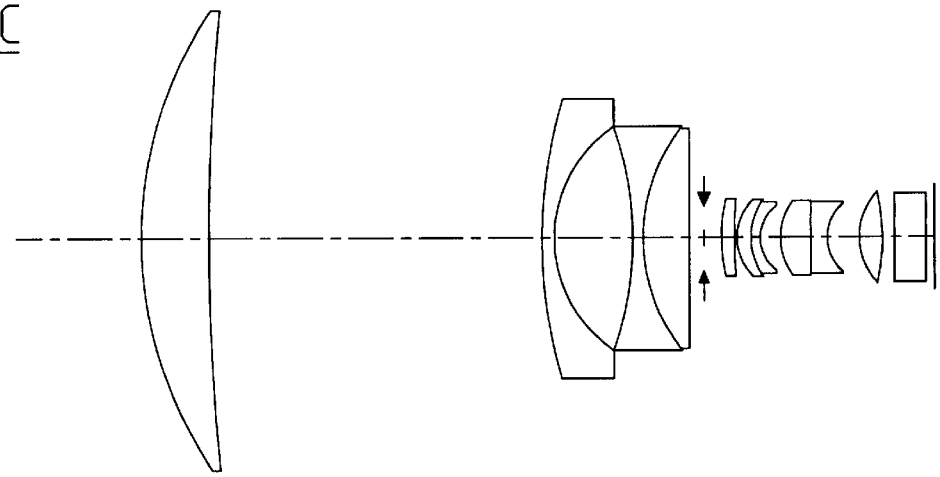

As shown in FIGS. 13A–13C, the zoom lens of this embodiment comprises, in order from the object side, the first lens unit G1 with positive refracting power, the second lens unit G2 with negative refracting power, the third lens unit G3 with positive refracting power, and the fourth lens unit G4 with positive refracting power.

The first lens unit G1 is constructed with the positive lens component having a convex surface which is the object-side surface of a larger curvature than the image-side surface.

The second lens unit G2 includes, in order from the object side, the meniscus lens component G21 with negative refracting power and the cemented lens component G22 with negative refracting power. The cemented lens component G22 has, in order from the object side, the biconcave lens element and the meniscus lens element whose concave surface directed toward the image side.

The third lens unit G3 includes, in order from the object side, the positive meniscus lens component G31 directing a convex surface toward the object side and the cemented lens component G32 with negative refracting power. The positive meniscus lens component G31 is configured so that its object-side surface is aspherical. The cemented lens component G32 has, in order from the object side, the positive lens element and the negative lens element, and is shaped into a meniscus form in which a convex surface is directed toward the object side.

The fourth lens unit G4 includes, in order from the object side, the cemented lens component G41 with positive refracting power and the biconvex lens component G2 with positive refracting power. The cemented lens component G41 has, in order from the object side, the positive lens element and the negative lens element, and is shape into a meniscus form in which a convex surface is directed toward the object side. The biconvex lens component G42 is constructed with a single lens component having an aspherical convex surface which is the object-side surface of a larger curvature than the image-side surface.

The magnification is changed in the range from the wide-angle position to the telephoto position, with the first and third lens units G1 and G3 fixed, in such a way that the second lens unit G2 is simply moved along the optical axis from the object side toward the image side, and the fourth lens unit G4 is simply moved from the image side toward the object side.

Focusing is performed by the fourth lens unit G4.

Subsequently, numerical data of optical members constituting the zoom lens of fifth embodiment are shown below.

Numerical data 5

|  | Wide-angle position | Middle position | Telephoto position |
|---|---|---|---|
| ω (°) | 32.81 | — | 11.69 |
| f (mm) | 7.069 | 14.018 | 20.856 |
| FNO | 1.98 | 2.00 | 2.00 |
| CCD pitch (μm) |  | 4.2~3.2 |  |

$r_1$ = 51.569
$\quad d_1$ = 7.76 $\quad n_{d1}$ = 1.48749 $\quad \nu_{d1}$ = 70.23
$r_2$ = −2083.247
$\quad d_2$ = D2 (variable)
$r_3$ = 68.007
$\quad d_3$ = 0.89 $\quad n_{d3}$ = 1.84666 $\quad \nu_{d3}$ = 23.78
$r_4$ = 18.068
$\quad d_4$ = 7.79
$r_5$ = −36.034
$\quad d_5$ = 0.79 $\quad n_{d5}$ = 1.48749 $\quad \nu_{d5}$ = 70.23
$r_6$ = 22.940
$\quad d_6$ = 4.00 $\quad n_{d6}$ = 1.84666 $\quad \nu_{d6}$ = 23.78
$r_7$ = 218.610
$\quad d_7$ = D7 (variable)
$r_8$ = ∞ (stop)
$\quad d_8$ = 1.47
$r_9$ = 13.091 (aspherical)
$\quad d_9$ = 1.23 $\quad n_{d9}$ = 1.58913 $\quad \nu_{d9}$ = 61.30
$r_{10}$ = 46.788
$\quad d_{10}$ = 0.10
$r_{11}$ = 5.835
$\quad d_{11}$ = 1.51 $\quad n_{d11}$ = 1.77250 $\quad \nu_{d11}$ = 49.60
$r_{12}$ = 8.105
$\quad d_{12}$ = 1.07 $\quad n_{d12}$ = 1.84666 $\quad \nu_{d12}$ = 23.78

-continued

Numerical data 5

$r_{13}$ = 4.552
$\quad d_{13}$ = D13 (variable)
$r_{14}$ = 7.932
$\quad d_{14}$ = 3.00 $\quad n_{d14}$ = 1.77250 $\quad \nu_{d14}$ = 49.60
$r_{15}$ = 2101.786
$\quad d_{15}$ = 1.53 $\quad n_{d15}$ = 1.62004 $\quad \nu_{d15}$ = 36.26
$r_{16}$ = 5.824
$\quad d_{16}$ = 2.72
$r_{17}$ = 6.644 (aspherical)
$\quad d_{17}$ = 2.65 $\quad n_{d17}$ = 1.48749 $\quad \nu_{d17}$ = 70.23
$r_{18}$ = −47.833
$\quad d_{18}$ = D18 (variable)
$r_{19}$ = ∞
$\quad d_{19}$ = 3.23 $\quad n_{d19}$ = 1.51633 $\quad \nu_{d19}$ = 64.14
$r_{20}$ = ∞
$\quad d_{20}$ = 1.00
$r_{21}$ = ∞ (imaging plane)

Aspherical coefficients

Ninth surface

K = 0
$A_4$ = −9.98638 × $10^{-6}$ $\quad A_6$ = −1.21268 × $10^{-5}$ $\quad A_8$ = 8.25389 × $10^{-7}$
$A_{10}$ = 2.08780 × $10^{-8}$ Seventeenth surface K = 0
$A_4$ = −4.72256 × $10^{-4}$ $\quad A_6$ = 9.60287 × $10^{-6}$ $\quad A_8$ = −3.15343 × $10^{-7}$ Zoom data

|  | Wide-angle position | Middle position | Telephoto position |
|---|---|---|---|
| D2 | 0.45 | 24.91 | 36.64 |
| D7 | 38.20 | 13.74 | 2.00 |
| D13 | 2.64 | 1.91 | 1.60 |
| D18 | 0.90 | 1.65 | 1.97 |

FIGS. 14A–14D and 15A–15D show aberration curves in the zoom lens of the fifth embodiment.

What is claimed is:

1. A zoom lens comprising, in order from an object side:
   a first lens unit with positive refracting power;
   a second lens unit with negative refracting power;
   a third lens unit with positive refracting power; and
   a fourth lens unit with positive refracting power,
   at least, said second lens unit and said fourth lens unit being moved along an optical axis to change spaces between individual lens units so that a magnification of said zoom lens is changed in the range of a wide-angle position to a telephoto position,
   wherein said third lens unit comprises three positive lens elements and one negative lens element located at a most image-side position.

2. A zoom lens according to claim 1, wherein said first lens unit consists of a positive lens component.

3. A zoom lens comprising, in order from an object side:
   a first lens unit with positive refracting power;
   a second lens unit with negative refracting power;
   a third lens unit with positive refracting power; and
   a fourth lens unit with positive refracting power,
   at least, said second lens unit and said fourth lens unit being moved along an optical axis to change spaces between individual lens units so that a magnification of said zoom lens is changed in the range of a wide-angle position to a telephoto position, wherein said fourth lens unit consists of, in order from said object side, a cemented lens component with positive refracting power and a single lens component with positive refracting power.

4. A zoom lens according to claim 3, wherein said first lens unit consists of a positive lens component.

5. A zoom lens according to claim 1 or 2, wherein at least one of said three positive lens elements and said negative lens element in said third lens unit are cemented to constitute a cemented lens component.

6. A zoom lens according to claim 5, wherein said cemented lens component is shaped into a meniscus form.

7. A zoom lens according to claim 3 or 4, wherein said cemented lens component with positive refracting power in said fourth lens unit is shaped into a meniscus form in which a convex surface is directed toward said object side.

8. A zoom lens according to claim 3 or 4, wherein said single lens component with positive refracting power in said fourth lens unit has an objective-side surface which is larger in curvature than an image-side surface.

9. A zoom lens according to any one of claims 1–4, wherein when said magnification is changed in the range of said wide-angle position to said telephoto position, said third lens unit is moved along said optical axis.

10. A zoom lens according to any one of claims 1–4, wherein when said magnification is changed in the range of said wide-angle position to said telephoto position, said fourth lens unit is moved so as to draw a convex trace.

11. A zoom lens according to any one of claims 1–4, wherein focusing on a nearby object point is performed by moving said fourth lens unit along said optical axis.

* * * * *